(12) United States Patent
Hoshinoo

(10) Patent No.: US 9,663,325 B2
(45) Date of Patent: May 30, 2017

(54) BRAKING APPARATUS AND ELEVATOR HOISTING MACHINE THAT USES SAME

(71) Applicant: MITSUBISHI ELECTRIC CORPORATION, Chiyoda-ku (JP)

(72) Inventor: Tomokazu Hoshinoo, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/782,395

(22) PCT Filed: Apr. 24, 2013

(86) PCT No.: PCT/JP2013/062031
§ 371 (c)(1),
(2) Date: Oct. 5, 2015

(87) PCT Pub. No.: WO2014/174602
PCT Pub. Date: Oct. 30, 2014

(65) Prior Publication Data
US 2016/0031674 A1    Feb. 4, 2016

(51) Int. Cl.
*B66B 1/36* (2006.01)
*F16F 1/36* (2006.01)
(Continued)

(52) U.S. Cl.
CPC ............ *B66B 1/36* (2013.01); *B66D 5/08* (2013.01); *B66D 5/30* (2013.01); *F16D 51/00* (2013.01);
(Continued)

(58) Field of Classification Search
CPC .... B66B 1/36; B66B 5/16; B66B 5/18; F16D 55/02; F16D 65/0006; F16D 2121/22; F16F 1/3615; F16F 1/3732
See application file for complete search history.

(56) References Cited

U.S. PATENT DOCUMENTS

| | | | | |
|---|---|---|---|---|
| 2,288,438 | A | * | 6/1942 | Dach ................... F16D 65/0006 188/218 R |
| 3,720,293 | A | * | 3/1973 | Hikida .................. F16D 55/228 188/71.8 |

(Continued)

FOREIGN PATENT DOCUMENTS

| | | |
|---|---|---|
| JP | 2004-115203 A | 4/2004 |
| JP | 2005-502838 A | 1/2005 |

(Continued)

OTHER PUBLICATIONS

International Search Report issued Jun. 25, 2013, in PCT/JP2013/062031 filed Apr. 24, 2013.

*Primary Examiner* — Minh Truong
(74) *Attorney, Agent, or Firm* — Oblon, McClelland, Maier & Neustadt, L.L.P.

(57) ABSTRACT

In a braking apparatus, a buffering member that is formed using a flexible material is disposed between a fixed portion and a movable portion. An accommodating recess portion that accommodates and holds the buffering member is disposed on a buffering member holding portion that includes at least one of the fixed portion and the movable portion. An opening portion that communicates with an external portion of the buffering member holding portion is disposed on a portion of a side surface of the accommodating recess portion. The buffering member is removable from and insertable into the accommodating recess portion through the opening portion from a direction that is perpendicular to a direction of displacement of the movable portion.

4 Claims, 9 Drawing Sheets

(51) Int. Cl.
*F16D 65/00* (2006.01)
*F16F 15/08* (2006.01)
*B66D 5/30* (2006.01)
*F16D 51/00* (2006.01)
*F16D 65/22* (2006.01)
*B66D 5/08* (2006.01)
*F16D 63/00* (2006.01)
*F16D 121/14* (2012.01)
*F16D 121/22* (2012.01)

(52) U.S. Cl.
CPC ....... *F16D 63/008* (2013.01); *F16D 65/0006* (2013.01); *F16D 65/22* (2013.01); *F16F 1/3615* (2013.01); *F16F 15/08* (2013.01); *F16D 2121/14* (2013.01); *F16D 2121/22* (2013.01)

(56) References Cited

U.S. PATENT DOCUMENTS

| | | | | |
|---|---|---|---|---|
| 3,741,353 A * | 6/1973 | McKinley | ............... | F16D 55/02 188/171 |
| 5,855,257 A * | 1/1999 | Wickert | ............... | F16D 65/0006 188/218 A |
| 6,155,386 A * | 12/2000 | Hirai | ............... | F16D 55/02 188/161 |
| 7,699,145 B2 * | 4/2010 | Ericson | ............... | B66B 11/08 187/250 |
| 8,104,162 B2 * | 1/2012 | Golden | ............... | B22D 19/00 188/381 |
| 8,590,869 B2 * | 11/2013 | Tavares | ............... | F16F 1/3732 267/152 |
| 8,857,577 B2 * | 10/2014 | Brown | ............... | F16D 65/0018 188/18 A |
| 2004/0262102 A1 * | 12/2004 | Ota | ............... | B66D 5/08 188/161 |
| 2016/0039637 A1 * | 2/2016 | Momoki | ............... | B66D 5/08 187/254 |

FOREIGN PATENT DOCUMENTS

JP    2008-120524 A    5/2008
WO    WO 03/023245 A1    3/2003

* cited by examiner

BRAKING APPARATUS AND ELEVATOR HOISTING MACHINE THAT USES SAME

TECHNICAL FIELD

The present invention relates to a braking apparatus in which a buffering member is disposed between a fixed portion and a movable portion, and to an elevator hoisting machine that uses the same.

BACKGROUND ART

In electromagnetic braking apparatuses of conventional elevator hoisting machines, a plurality of insertion apertures are disposed on a surface of a fixed core that faces an armature. A rubber buffering member that reduces operating noise of the armature is inserted into each of the insertion apertures. The buffering members protrude from the insertion apertures (see Patent Literature 1, for example).

In electromagnetic braking apparatuses such as that described above, one problem has been that operating noise of the armature increases if the buffering members deteriorate. Deterioration worsens at high temperatures, for example, making the rubber buffering members smaller and harder. As a result thereof, reaction forces from the buffering members become lower than at first, giving rise to situations such as operating noise being increased, etc.

In answer to that, methods in which quality of operating noise is maintained by replacing the buffering members are also conceivable, but dismantling of the electromagnetic braking apparatuses may be difficult, depending on the construction or installed state of the electromagnetic braking apparatus, making it difficult to replace the buffering members.

On the other hand, compression-spring-type electromagnetic braking apparatuses have also been proposed that include mechanisms that push the buffering members directly in an axial direction using screws, etc. (see Patent Literature 2, for example).

CITATION LIST

Patent Literature

[Patent Literature 1]
  Japanese Patent Laid-Open No. 2008-120524 (Gazette)
[Patent Literature 2]
  Japanese Patent Laid-Open No. 2005-502838 (Gazette)

SUMMARY OF THE INVENTION

Problem to be Solved by the Invention

However, in the conventional electromagnetic braking apparatus that is disclosed in Patent Literature 2, when deterioration of the buffering members worsens and cannot be accommodated by position adjustment, replacement of the buffering members is required, and it is necessary to dismantle the fixed portions and the movable portions of the braking apparatus, which is labor-intensive.

The present invention aims to solve the above problems and an object of the present invention is to provide a braking apparatus, and an elevator hoisting machine that uses the same, in which buffering members can be easily replaced without dismantling a fixed portion and a movable portion.

Means for Solving the Problem

In order to achieve the above object, according to one aspect of the present invention, there is provided a braking apparatus including: a fixed portion; a movable portion that is displaceable toward and away from the fixed portion; a friction member that is disposed on the movable portion, and that brakes rotation of a rotating body by being placed in contact with the rotating body; a forcing device that forces the movable portion in a direction that places the friction member in contact with the rotating body; a braking force releasing device that displaces the movable portion in a direction in which the friction member separates from the rotating body in opposition to the forcing device; and a buffering member that is disposed between the fixed portion and the movable portion, wherein: an accommodating recess portion that accommodates and holds the buffering member is disposed on a buffering member holding portion that includes at least one of the fixed portion and the movable portion; an opening portion that communicates with an external portion of the buffering member holding portion is disposed on a portion of a side surface of the accommodating recess portion; and the buffering member is removable from and insertable into the accommodating recess portion through the opening portion from a direction that is perpendicular to a direction of displacement of the movable portion.

According to another aspect of the present invention, there is provided a braking apparatus including: a fixed portion; a movable portion that is displaceable toward and away from the fixed portion; a friction member that is disposed on the movable portion, and that brakes rotation of a rotating body by being placed in contact with the rotating body; a forcing device that forces the movable portion in a direction that places the friction member in contact with the rotating body; a braking force releasing device that displaces the movable portion in a direction in which the friction member separates from the rotating body in opposition to the forcing device; and a buffering member that is disposed between the fixed portion and the movable portion, wherein: a holder that holds the buffering member is mounted by means of a fastening device to a buffering member holding portion that includes at least one of the fixed portion and the movable portion; and the holder is removable from and insertable into the accommodating recess portion in a direction that is perpendicular to a direction of displacement of the movable portion by removing the fastening device.

According to yet another aspect of the present invention, there is provided an elevator hoisting machine including: a rotating body that has a driving sheave around which a suspending body that suspends a car and a counterweight is wound; a motor that rotates the rotating body; and a braking apparatus that brakes rotation of the rotating body, the braking apparatus having: a fixed portion; a movable portion that is displaceable toward and away from the fixed portion; a friction member that is disposed on the movable portion, and that brakes rotation of a rotating body by being placed in contact with the rotating body; a forcing device that forces the movable portion in a direction that places the friction member in contact with the rotating body; a braking force releasing device that displaces the movable portion in a direction in which the friction member separates from the rotating body in opposition to the forcing device; and a buffering member that is disposed between the fixed portion and the movable portion, wherein: an accommodating recess portion that accommodates and holds the buffering member is disposed on a buffering member holding portion that includes at least one of the fixed portion and the movable portion; an opening portion that communicates with an external portion of the buffering member holding portion is disposed on a portion of a side surface of the accommodating recess portion; and the buffering member is removable from and insertable into the accommodating recess portion through the opening portion from a direction that is perpendicular to a direction of displacement of the movable portion.

According to yet another aspect of the present invention, there is provided an elevator hoisting machine including: a rotating body that has a driving sheave around which a suspending body that suspends a car and a counterweight is wound; a motor that rotates the rotating body; and a braking apparatus that brakes rotation of the rotating body, the braking apparatus having: a fixed portion; a movable portion that is displaceable toward and away from the fixed portion; a friction member that is disposed on the movable portion, and that brakes rotation of a rotating body by being placed in contact with the rotating body; a forcing device that forces the movable portion in a direction that places the friction member in contact with the rotating body; a braking force releasing device that displaces the movable portion in a direction in which the friction member separates from the rotating body in opposition to the forcing device; and a buffering member that is disposed between the fixed portion and the movable portion, wherein: a holder that holds the buffering member is mounted by means of a fastening device to a buffering member holding portion that includes at least one of the fixed portion and the movable portion; and the holder is removable from and insertable into the accommodating recess portion in a direction that is perpendicular to a direction of displacement of the movable portion by removing the fastening device.

Effects of the Invention

In the braking apparatus and the elevator hoisting machine according to the present invention, because an opening portion that communicates with an external portion of the buffering member holding portion is disposed on a portion of a side surface of the accommodating recess portion, and the buffering member is removable from and insertable into the accommodating recess portion through the opening portion from a direction that is perpendicular to a direction of displacement of the movable portion, the buffering member can be easily replaced without dismantling the fixed portion and the movable portion.

In the braking apparatus and the elevator hoisting machine according to the present invention, because a holder that holds the buffering member is mounted by means of a fastening device to a buffering member holding portion, and the holder is removable from and insertable into the accommodating recess portion in a direction that is perpendicular to a direction of displacement of the movable portion by removing the fastening device, the buffering member can be easily replaced without dismantling the fixed portion and the movable portion.

DESCRIPTION OF EMBODIMENTS

Preferred embodiments of the present invention will now be explained with reference to the drawings.

Embodiment 1

Figure 1:
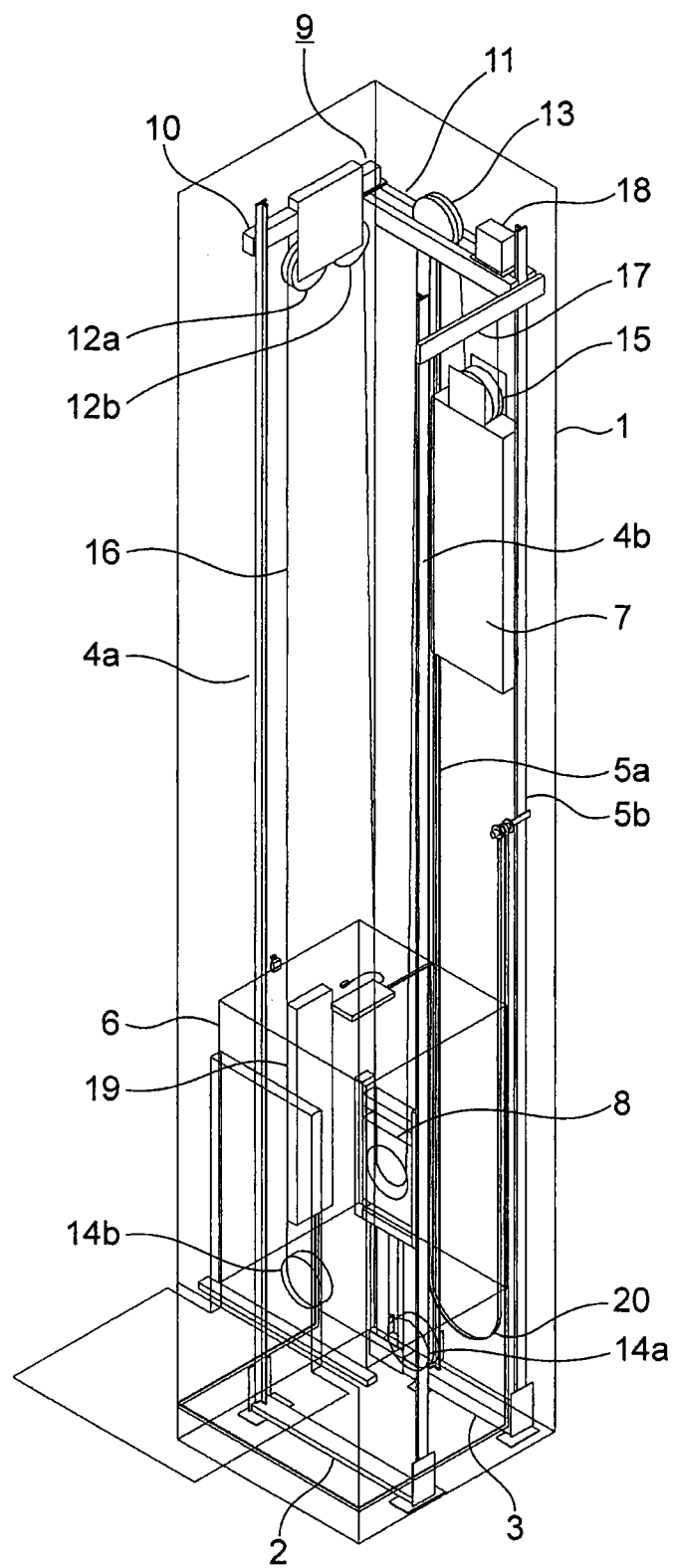
FIG. 1 is an oblique projection that shows an elevator according to Embodiment 1 of the present invention.

FIG. 1 is an oblique projection that shows an elevator according to Embodiment 1 of the present invention, and shows the interior of a hoistway transparently. In the figure, a car buffer base 2 and a counterweight buffer base 3 are fixed to a bottom portion of a hoistway 1. A car buffer (not shown) is installed on the car buffer base 2. A counterweight buffer (not shown) is installed on the counterweight buffer base 3.

A pair of car guide rails 4a and 4b and a pair of counterweight guide rails 5a and 5b are installed inside the hoistway 1. Lower end portions of the car guide rails 4a and 4b are positioned on the car buffer base 2. Lower end portions of the counterweight guide rails 5a and 5b are positioned on the counterweight buffer base 3.

A car 6 is raised and lowered inside the hoistway 1 so as to be guided by the car guide rails 4a and 4b. A counterweight 7 is raised and lowered inside the hoistway 1 so as to be guided by the counterweight guide rails 5a and 5b. The counterweight 7 is disposed behind the car 6 so as to face a back surface of the car 6 when positioned level with the car 6.

An elevator hoisting machine 8 that raises and lowers the car 6 and the counterweight 7 is installed in a lower portion inside the hoistway 1. A thin hoisting machine in which an axial dimension is smaller than dimensions that are perpendicular to an axial direction is used as the elevator hoisting machine 8.

An L-shaped return sheave beam 9 is installed in a top portion of the hoistway 1. The return sheave beam 9 has: a car return sheave beam 10; and a counterweight return sheave beam 11 that is linked perpendicularly to a first end portion of the car return sheave beam 10.

A pair of car return sheaves 12a and 12b are supported by the car return sheave beam 10. A counterweight return sheave 13 is supported by the counterweight return sheave beam 11.

A pair of car suspending sheaves 14a and 14b are disposed on a lower portion of the car 6. A counterweight suspending sheave 15 is disposed on an upper portion of the counterweight 7.

The car 6 and the counterweight 7 are suspended inside the hoistway 1 by a plurality of main ropes 16 (only one is shown in the figure) that constitute a suspending body.

A rope fastener beam 17 is fixed horizontally between a vicinity of an upper end portion of a car guide rails 4b and a vicinity of an upper end portion of the counterweight guide rail 5b. A car rope fastener portion (not shown) is disposed on the rope fastener beam 17. A counterweight rope fastener portion 18 is disposed on the counterweight return sheave beam 11.

The main ropes 16 have: first end portions that are connected to the car rope fastener portion; and second end portions that are connected to the counterweight rope fastener portion 18. The main ropes 16 are wound from near the first end portions sequentially around the car suspending sheaves 14a and 14b, the car return sheaves 12a and 12b, the elevator hoisting machine 8, the counterweight return sheave 13, and the counterweight suspending sheave 15 (two-to-one (2:1) roping).

A controlling board 19 is installed on a hoistway wall in a vicinity of a lowermost floor. An elevator controlling apparatus that controls movement of the car 6 is disposed on the controlling board 19. A controlling cable 20 is suspended between the hoistway wall and the car 6.

Figure 2:
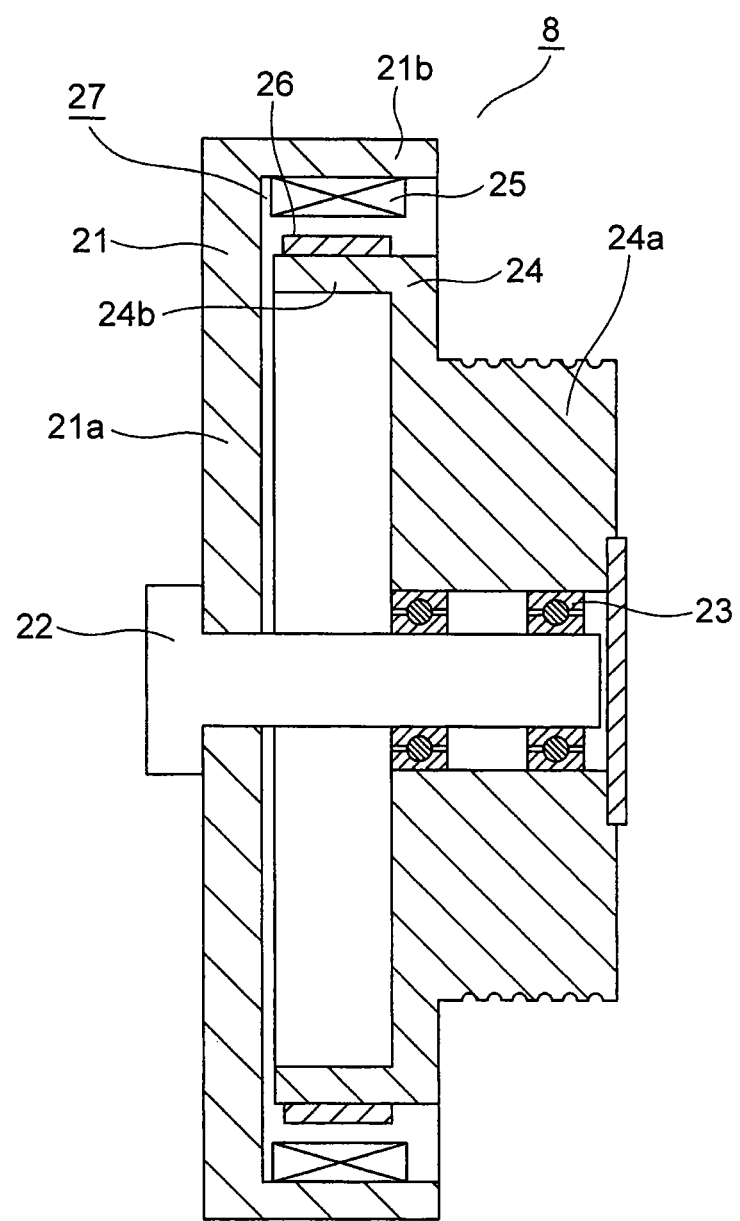
FIG. 2 is a schematic cross section that is taken parallel to a shaft axis of an elevator hoisting machine from FIG. 1.

FIG. 2 is a schematic cross section that is taken parallel to a shaft axis of the elevator hoisting machine 8 from FIG. 1. The housing 21 has: a flat shaft supporting portion 21a; and a cylindrical stator supporting portion 21b that protrudes outward from the shaft supporting portion 21a on a first side. A horizontal fixed shaft 22 is cantilevered centrally on the shaft supporting portion 21a.

A rotating body 24 is rotatably supported on the fixed shaft 22 by means of a pair of bearings 23. The bearings 23 are disposed so as to be spaced apart from each other in an axial direction of the fixed shaft 22. A cylindrical driving sheave 24a around which the main ropes 16 are wound and a cylindrical magnet supporting portion 24b that faces an inner circumferential surface of the stator supporting portion 21b are disposed integrally on the rotating body 24.

A plurality of rope grooves into which the main ropes 16 are inserted are disposed on an outer circumferential surface of the driving sheave 24a. The stator supporting portion 21b is disposed on an axial end portion of the rotating body 24 near of the housing 21. The magnet supporting portion 24b is disposed so as to be coaxial to the stator supporting portion 21b, and is surrounded by the stator supporting portion 21b. Furthermore, an outside diameter of the magnet supporting portion 24b is larger than a diameter of the driving sheave 24a.

A stator 25 onto which coils are wound is fixed to an inner circumferential surface of the stator supporting portion 21b. A plurality of permanent magnets 26 that face the stator 25 are fixed to an outer circumferential surface of the magnet supporting portion 24b so as to have uniform spacing in a circumferential direction. The motor 27 is constituted by this stator 25 and the permanent magnets 26, and the rotating body 24 is rotated by a driving force from the motor 27 such that the car 6 and the counterweight 7 are raised and lowered.

Figure 3:
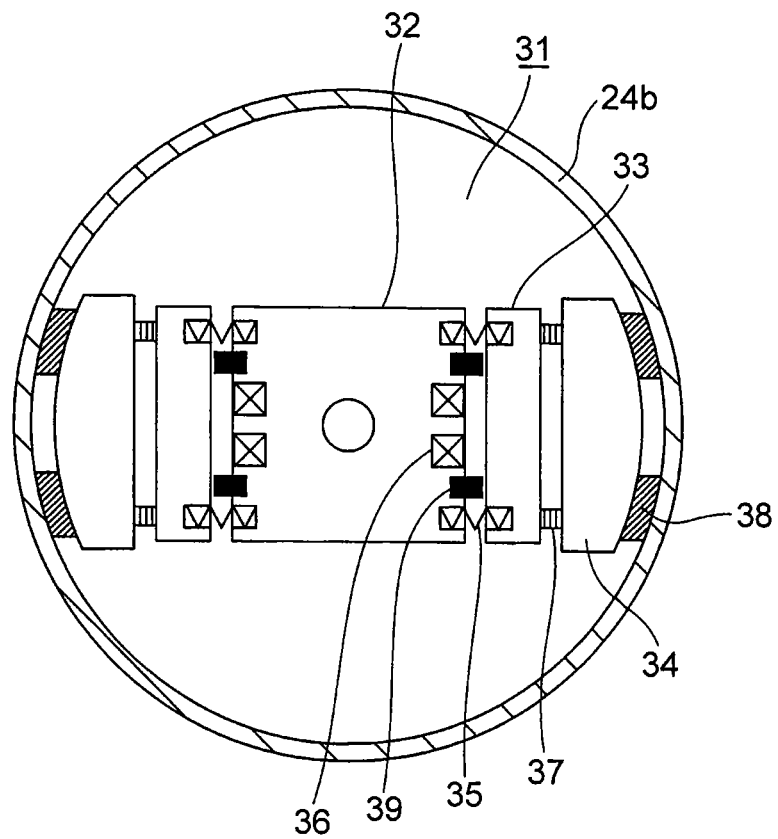
FIG. 3 is a cross section that is perpendicular to a shaft axis of a magnet supporting portion from FIG. 2.

FIG. 3 is a cross section that is perpendicular to a shaft axis of the magnet supporting portion 24b from FIG. 2. Although omitted from FIG. 2, a pair of braking apparatuses 31 that brake rotation of the rotating body 24 are accommodated inside the magnet supporting portion 24b. The braking apparatuses 31 have similar or identical constructions to each other, and are disposed so as to be oriented in opposite directions to each other.

Each of the braking apparatuses 31 has: a fixed core (a field) 32 that functions as a fixed portion; a movable core (an armature) 33 that functions as a movable portion; a brake shoe 34 that functions as a friction member; a plurality of brake springs 35 that function as a forcing device; and an electromagnetic coil 36 that functions as a braking force releasing device.

In this example, the fixed cores 32 of the two braking apparatuses 31 are constituted by a single body. The movable cores 33 are displaceable in directions of contact with and separation from the fixed core 32 (left and right in FIG. 3). The brake shoes 34 are linked to the movable cores 33 by means of pairs of linking bolts 37 so as to displace together with the movable cores 33.

The brake shoes 34 brake rotation of the rotating body 24, or hold a stationary state of the rotating body 24, by being placed in contact with an inner circumferential surface of the magnet supporting portion 24b that constitutes a braking surface. In other words, the magnet supporting portion 24b also serves as a brake drum. A plurality of brake linings 38 are fixed to portions of the brake shoes 34 that come into contact with the magnet supporting portion 24b.

The brake springs 35 force the movable cores 33 in directions that place the brake shoes 34 in contact with the braking surface. When energized, the electromagnetic coils 36 displace the movable cores 33 in directions in which the brake shoes 34 separate from the braking surface in opposition to spring forces from the brake springs 35.

In other words, when the electromagnetic coils 36 are energized, electromagnetic forces are generated, and the movable cores 33 are attracted to the fixed core 32, separating the brake shoes 34 from the braking surface, and releasing braking force. When the passage of electric current to the electromagnetic coils 36 is interrupted, the brake shoes 34 are pressed against the braking surface by the spring forces from the brake springs 35.

A plurality of buffering members 39 that reduce operating noise of the movable cores 33 are disposed between the fixed core 32 and the movable cores 33. Each of the buffering members 39 is constituted by a flexible material such as rubber, a soft plastic, or a resin, etc., except for a metal spring.

Figure 4:
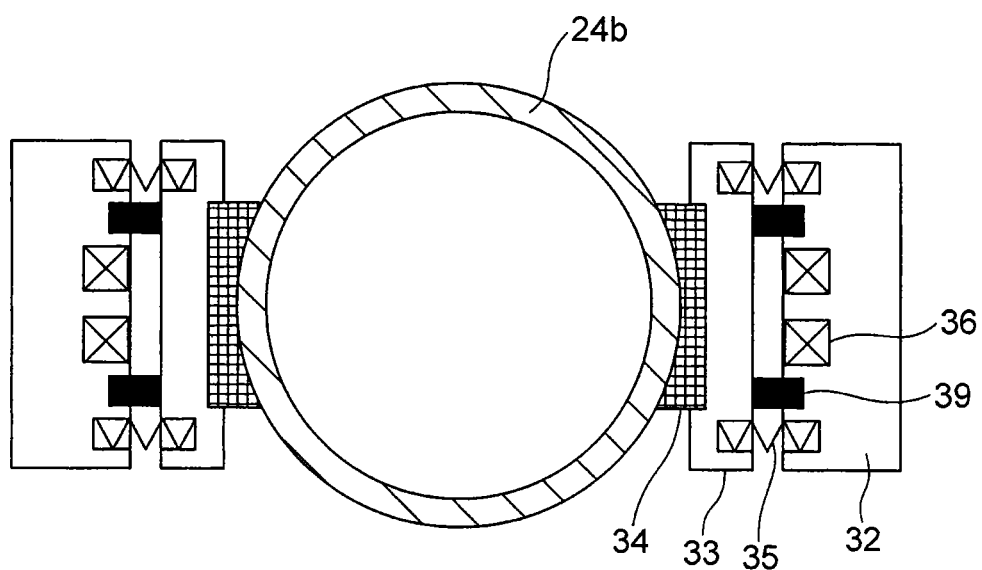
FIG. 4 is a cross section that shows an example of a braking apparatus of a type that is different than that in FIG. 3.

FIG. 4 is a cross section that shows an example of a braking apparatus of a type that is different than that in FIG. 3. Moreover, the basic construction is similar or identical to that of the braking apparatus 31 in FIG. 3, and numbering that is identical to that of FIG. 3 has been applied to portions that correspond to each portion of the braking apparatus 31 in FIG. 3.

In this example, a pair of braking apparatuses are disposed outside a rotating body 24. A magnet supporting portion 24b is disposed radially outside a stator supporting portion 21b. A stator 25 is fixed to an outer circumferential surface of the stator supporting portion 21b, and permanent magnets 26 are fixed to an inner circumferential surface of the magnet supporting portion 24b.

Figure 5:
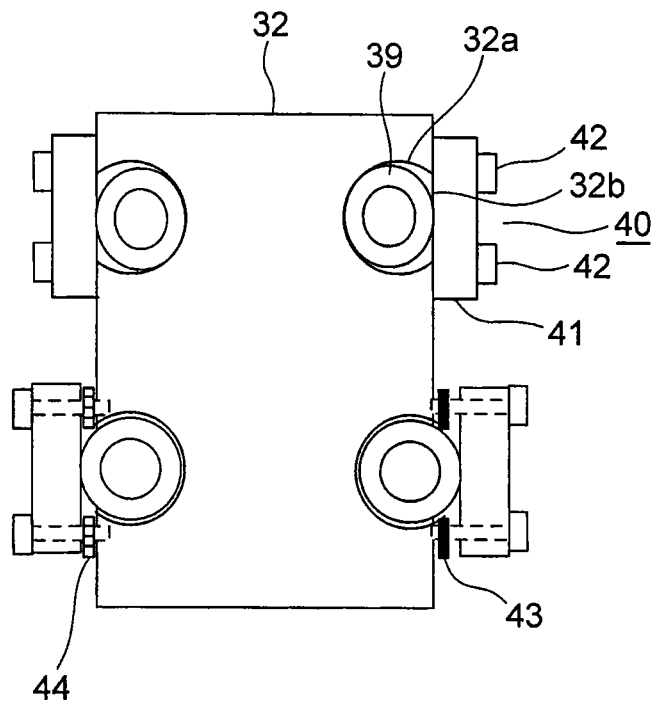
FIG. 5 is a front elevation that shows a fixed core from FIG. 3 or FIG. 4.

FIG. 5 is a front elevation that shows the fixed core 32 from FIG. 3 or FIG. 4. The buffering members 39 are hollow members, and more specifically, have a cylindrical external shape. A plurality of (four in this example) accommodating recess portions 32a are disposed on the fixed core 32. The buffering members 39 are accommodated and held in the corresponding accommodating recess portions 32a. In other words, a buffering member holding portion according to Embodiment 1 is the fixed core 32.

End portions of the buffering members 39 near the movable cores 33 protrude further toward the movable cores 33 than a surface of the fixed core 32 that faces the movable cores 33. An opening portion 32b that communicates with an outer portion of the fixed core 32 is disposed on a portion of a side surface of each of the accommodating recess portions 32a. When external forces are not acting on the buffering members 39, portions of the outer circumferential surfaces of the buffering members 39 protrude from the opening portions 32b.

The buffering members 39 are removable from and insertable into the accommodating recess portions 32a by being passed through the opening portions 32b from directions (left and right in FIG. 5) that are perpendicular to a direction of displacement (a direction that is perpendicular to the surface of the page in FIG. 5) of the movable cores 33. In other words, the buffering members 39 are removable from and insertable into the accommodating recess portions 32a from the side surfaces of the fixed core 32 by elastically deforming.

A plurality of deforming device 40 that deform the buffering members 39 by pressing the buffering members 39 in directions that are perpendicular to the direction of displacement of the movable cores 33 are disposed on the fixed core 32. Each of the deforming device 40 has: an adjusting bracket 41 that is placed in contact with a portion of the outer circumferential surface of the buffering member 39 that protrudes outward from the fixed core 32; and a pair of adjusting bolts 42 that pass through the adjusting bracket 41 and are screwed into a side surface of the fixed core 32.

An axial direction of the adjusting bolts 42 (left and right in FIG. 5) is a direction that is perpendicular to the direction of displacement of the movable cores 33 (perpendicular to the surface of the page in FIG. 5). The buffering members 39 are compressed by the adjusting brackets 41 from radially outside. An amount of compression of the buffering members 39 may be adjusted using adjusting shims 43 or adjusting nuts 44. The adjusting bolts 42 pass through the adjusting shims 43 or the adjusting nuts 44 between the adjusting brackets 41 and the fixed core 32.

The adjusting brackets 41 are displaced toward the fixed core 32, and the buffering members 39 are deformed, by fastening the adjusting bolts 42. In other words, the deforming device 40 reduces the outside diameter of the buffering members 39 by pressing the outer circumferential surfaces of the buffering members 39.

Figure 6:
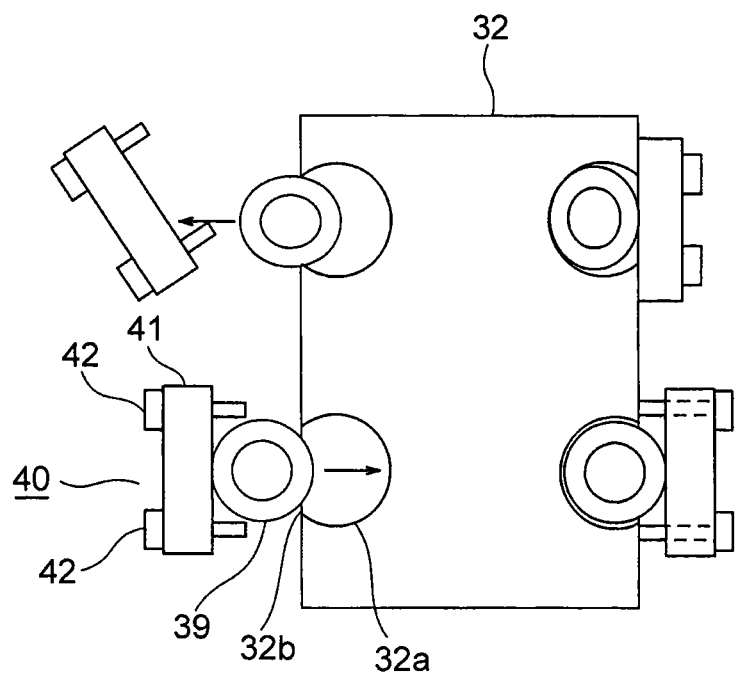
FIG. 6 is a front elevation that shows stages of the buffering members from FIG. 5 being replaced.

FIG. 6 is a front elevation that shows stages of the buffering members 39 from FIG. 5 being replaced. The opening portions 32b are opened by loosening the adjusting bolts 42, and removing the adjusting brackets 41 from the fixed core 32. Thus, the buffering members 39 can be easily replaced through the opening portions 32b without dismantling the fixed core 32 and the movable cores 33.

Normally, dislodging of the buffering members 39 from the opening portions 32b is prevented when the adjusting brackets 41 are mounted onto the side surfaces of the fixed core 32. In other words, the adjusting brackets 41 also function as stoppers for the buffering members 39.

Figure 7:
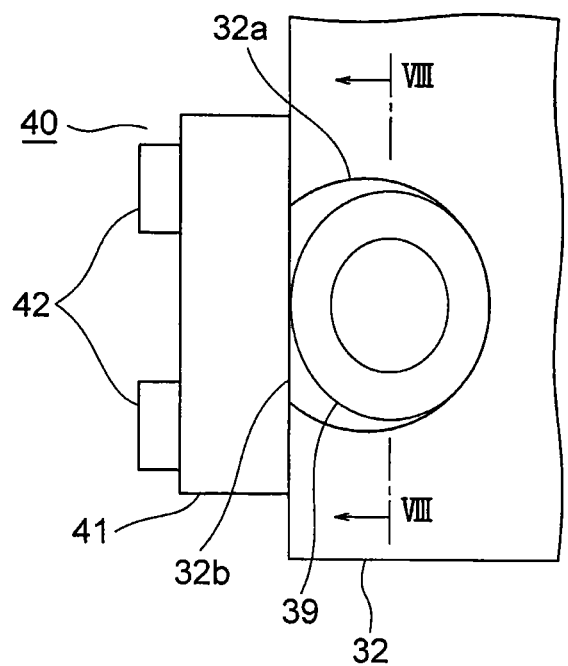
FIG. 7 is a front elevation that shows a portion of a fixed core from FIG. 5 enlarged.
Figure 8:
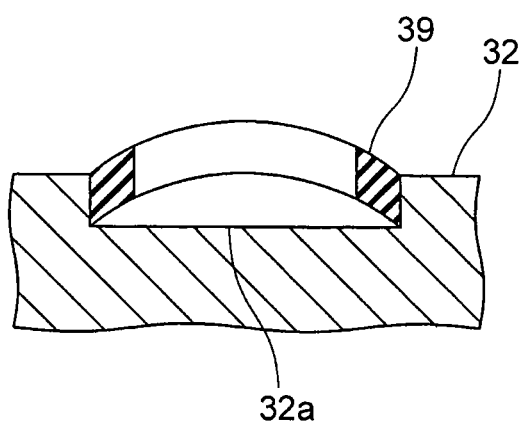
FIG. 8 is a cross section that is taken along Line VIII-VIII in FIG. 7.
Figure 9:
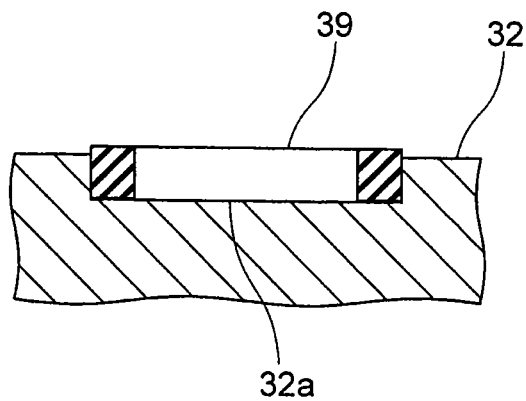
FIG. 9 is a cross section that shows a state before the buffering member in FIG. 8 is compressed.

FIG. 7 is a front elevation that shows a portion of the fixed core 32 from FIG. 5 enlarged, FIG. 8 is a cross section that is taken along Line VIII-VIII in FIG. 7, and FIG. 9 is a cross section that shows a state before the buffering member 39 in FIG. 8 is compressed. The buffering members 39 are curved when compressed by the adjusting brackets 41. The amount of protrusion of the buffering members 39 from the surfaces of the fixed core 32 that face the movable cores 33 and the spring modulus are changed thereby.

Consequently, the reaction force characteristics of the buffering members 39 can be adjusted, and the replacement frequency of the buffering members 39 can be reduced, without replacing the buffering members 39, by adjusting the amount of fastening of the adjusting bolts 42. It is still necessary replace the buffering members 39 if the range of adjustment by the deforming device 40 is exceeded, but in that case also, the replacement operation is facilitated as described above.

Figure 10:
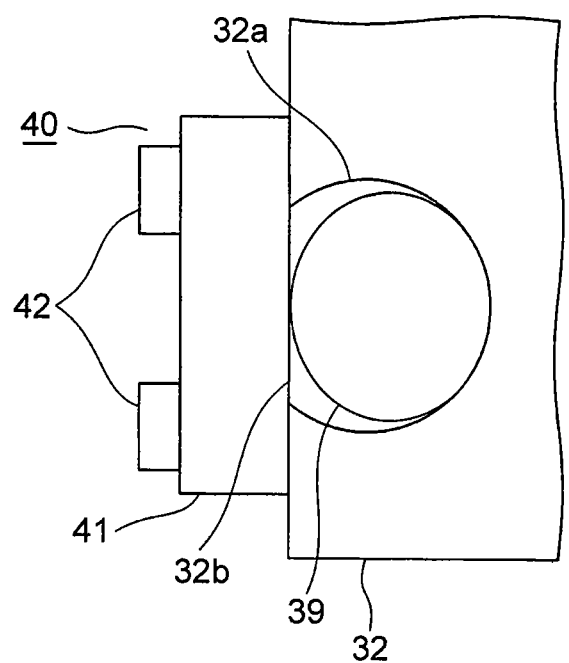
FIG. 10 is a front elevation that shows a variation of the buffering member in FIG. 7.

Moreover, in Embodiment 1, a cylindrical buffering member is shown, but is not limited to this, and a circular cross section such as that of an O ring, a solid shape such as that shown in FIG. 10, or a spherical shape may also be used, for example. Hollow buffering members have reduced reaction forces compared to those of solids, but the spring multiplier can be reduced to reduce sensitivity to adjustment, enabling reaction force adjustment to be facilitated.

Embodiment 2

Figure 11:
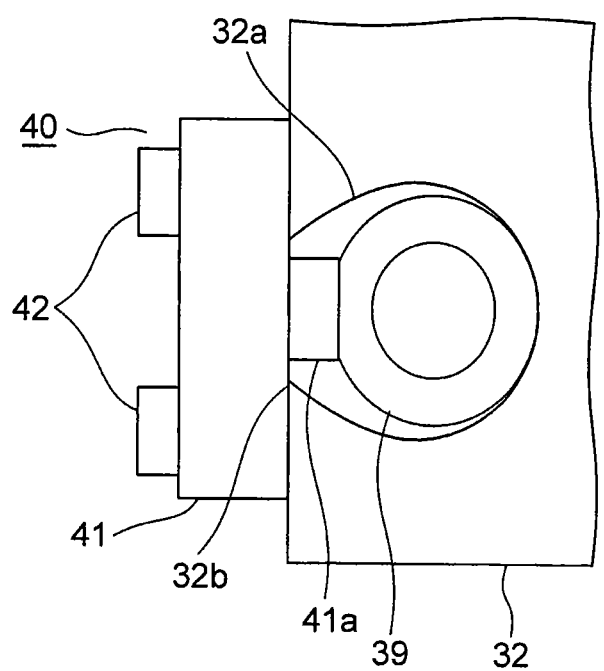
FIG. 11 is a front elevation that shows a portion of a fixed core of a braking apparatus according to Embodiment 2 of the present invention enlarged.

Next, FIG. 11 is a front elevation that shows a portion of a fixed core 32 of a braking apparatus 31 according to Embodiment 2 of the present invention enlarged. In this example, a buffering member 39 is accommodated entirely within an accommodating recess portion 32a when not being subjected to external forces. In other words, the buffering member 39 is disposed further inside the accommodating recess portion 32a than an opening portion 32b. In answer to that, a protruding portion 41a that is inserted into the opening portion 32b so as to be placed in contact with a portion of the outer circumferential surface of the buffering member 39 is disposed on an adjusting bracket 41.

The adjusting bracket 41 is displaced toward a fixed core 32, and the buffering member 39 is deformed by the protruding portion 41a, by fastening adjusting bolts 42. The rest of the configuration is similar or identical to that of Embodiment 1.

In a braking apparatus 31 of this kind, the buffering members 39 can also be easily replaced through the opening portions 32b without dismantling the fixed core 32 and the movable cores 33. The reaction force characteristics of the buffering members 39 can also be adjusted without replacing the buffering members 39.

Moreover, in Embodiment 2, the buffering member is also not limited to being cylindrical, and a circular cross section such as that of an O ring, a solid shape such as that shown in FIG. 10, or a spherical shape may also be used, for example.

Embodiment 3

Figure 12:
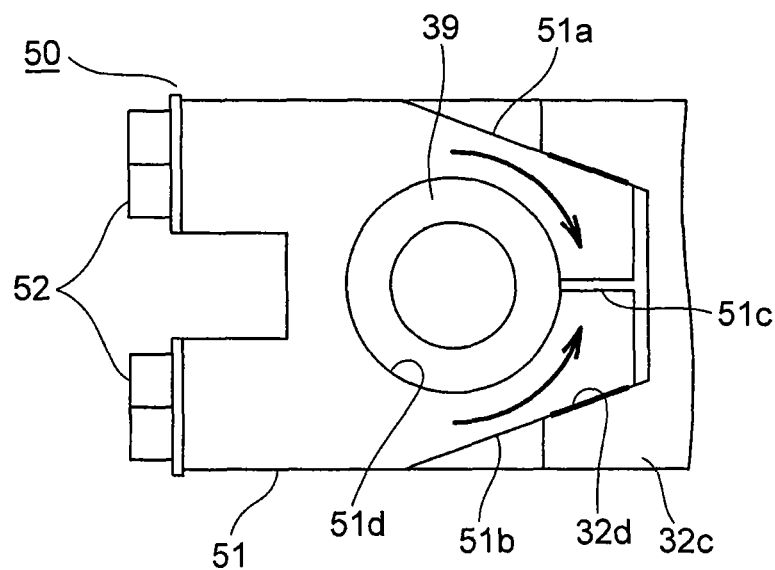
FIG. 12 is a front elevation that shows part of a braking apparatus according to Embodiment 3 of the present invention.
Figure 13:
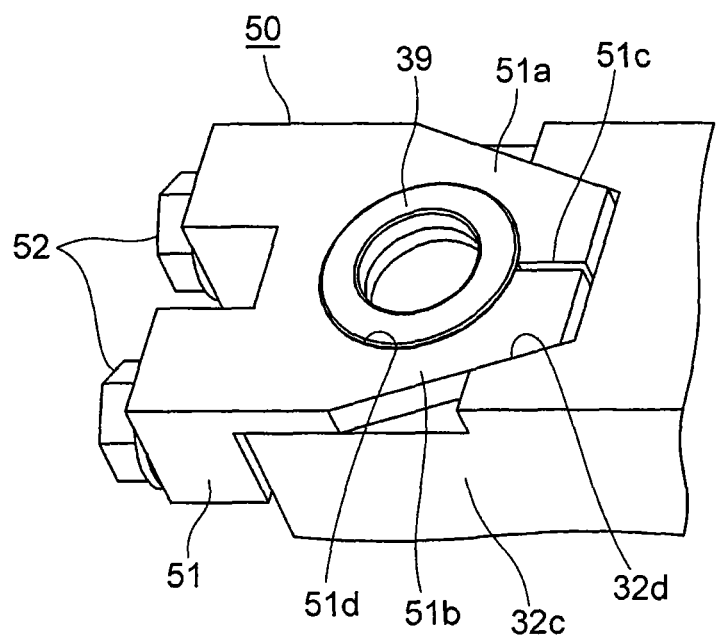
FIG. 13 is an oblique projection that shows part of the braking apparatus in FIG. 12.

Next, FIG. 12 is a front elevation that shows part of a braking apparatus according to Embodiment 3 of the present invention, and FIG. 13 is an oblique projection that shows part of the braking apparatus in FIG. 12. A deforming device 50 according to Embodiment 3 has: a holder 51 that holds a buffering member 39; a holder mounting portion 32c that is disposed on a fixed core 32; and a pair of adjusting bolts 52 that function as fastening devices that attach the holder 51 to the holder mounting portion 32c.

Figure 14:
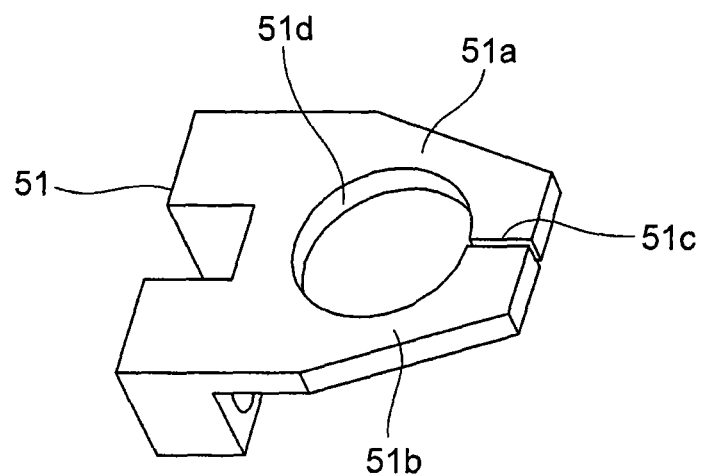
FIG. 14 is an oblique projection that shows a holder from FIG. 12.

The holder 51 has a pair of clamping portions 51a and 51b that hold the buffering member 39. A gap 51c is disposed between tip end portions of the clamping portions 51a and 51b. In other words, a C-shaped inner peripheral surface 51d that contacts an outer circumferential surface of the buffering member 39 is formed on the holder 51, as shown in FIG. 14.

A tapered groove 32d with which the tip end portions of the clamping portions 51a and 51b engage is disposed on the holder mounting portion 32c. A shape of the tip end portions of the clamping portions 51a and 51b is a wedge shape that corresponds to a shape of the groove 32d.

The adjusting bolts 52 pass through the holder 51 and are screwed into screw-threaded apertures (not shown) that are disposed on a side surface of the fixed core 32. An axial direction of the adjusting bolts 52 (left and right in FIG. 12) is a direction that is perpendicular to a direction of displacement of movable cores 33 (perpendicular to the surface of the page in FIG. 12). The holder 51 is removable from and insertable into the fixed core 32 in directions (left and right in FIG. 12) that are perpendicular to the direction of displacement of the movable cores 33 by removing the adjusting bolts 52.

The holder 51 is moved to the right in FIG. 12, and the tip end portions of the clamping portions 51a and 51b are pressed into the groove 32d, by fastening the adjusting bolts 52. The gap 51c is reduced thereby, reducing the external shape of the buffering member 39. In other words, the deforming device 50 reduces the outside diameter of the buffering members 39 by pressing the outer circumferential surfaces of the buffering members 39. Axial dimensions of the buffering member 39 are thereby increased. The rest of the configuration is similar or identical to that of Embodiment 1.

In a braking apparatus 31 of this kind, because the buffering member 39 is held by the holder 51, and the holder 51 is removable from and insertable into the fixed core 32 in directions that are perpendicular to the direction of displacement of the movable core 33, the buffering member 39 can be easily replaced through the opening portion 32b without dismantling the fixed core 32 and the movable core 33.

The reaction force characteristics of the buffering members 39 can also be adjusted without replacing the buffering members 39, by adjusting the amount of fastening of the adjusting bolts 52. In other words, not only the amount of protrusion of the buffering member 39 but also the spring modulus can be adjusted.

Embodiment 4

Figure 15:
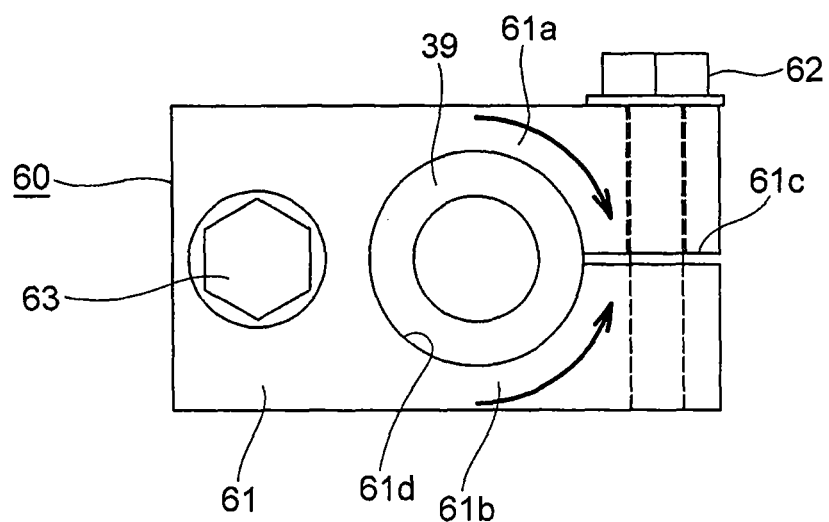
FIG. 15 is a front elevation that shows part of a braking apparatus according to Embodiment 4 of the present invention.

Next, FIG. 15 is a front elevation that shows part of a braking apparatus according to Embodiment 4 of the present invention. A deforming device 60 according to Embodiment 4 has: a holder 61 that holds a buffering member 39; an adjusting bolts 62 that is disposed on the holder 61; and a fixing bolt 63 that functions as a fastening device that fixes the holder 61 to a surface of a fixed core 32 that faces a movable core 33.

The holder 61 has a pair of clamping portions 61a and 61b that hold the buffering member 39. A gap 61c is disposed between tip end portions of the clamping portions 61a and 61b. In other words, a C-shaped inner peripheral surface 61d that contacts an outer circumferential surface of the buffering member 39 is formed on the holder 61.

The adjusting bolt 62 is disposed so as to span the tip end portions of the clamping portions 61a and 61b. The adjusting bolt 62 passes through the tip end portion of a clamping portion 61a, and is screwed into a screw-threaded aperture that is disposed on a tip end portion of a clamping portion 61b.

An axial direction of the adjusting bolt 62 (up and down in FIG. 15) is a direction that is perpendicular to a direction of displacement of a movable core 33 (perpendicular to the surface of the page in FIG. 15). An axial direction of the fixing bolt 63 is parallel to the direction of displacement of the movable core 33.

A recess portion that accommodates the holder 61 is disposed on the fixed core 32 such that only an end portion of the buffering member 39 near the movable core 33 protrudes beyond a surface of the fixed core 32 that faces the movable core 33. In addition, the tip end portions of the clamping portions 61a and 61b and the adjusting bolt 62 protrude further outward than the side surface of the fixed core 32 such that manipulation of the adjusting bolt 62 can be performed without dismantling the fixed core 32 and the movable core 33.

By fastening the adjusting bolt 62, the gap 61c is made smaller, reducing the external shape of the buffering member 39. In other words, the deforming device 60 reduces the outside diameter of the buffering members 39 by pressing the outer circumferential surfaces of the buffering members 39. Axial dimensions of the buffering member 39 are thereby increased.

A penetrating aperture for mounting and removing the fixing bolt 63 is disposed on a portion of the movable core 33 that faces the fixing bolt 63. The holder 61 is removable from and insertable into the fixed core 32 in directions (left and right in FIG. 15) that are perpendicular to the direction of displacement of the movable cores 33 by removing the fixing bolt 62 through the penetrating aperture. The rest of the configuration is similar or identical to that of Embodiment 1.

In a braking apparatus 31 of this kind, because the buffering member 39 is held by the holder 61, and the holder 61 is removable from and insertable into the fixed core 32 in directions that are perpendicular to the direction of displacement of the movable core 33, the buffering member 39 can be easily replaced through the opening portion 32b without dismantling the fixed core 32 and the movable core 33.

The reaction force characteristics of the buffering members 39 can also be adjusted without replacing the buffering members 39, by adjusting the amount of fastening of the adjusting bolt 62. In other words, not only the amount of protrusion of the buffering member 39 but also the spring modulus can be adjusted.

Moreover, in Embodiment 4, the adjusting bolt 62 is screwed into the screw-threaded aperture of a clamping portion 61b, but an adjusting nut may be screwed onto a tip end portion of an adjusting bolt 62 that is passed through both of the clamping portions 61a and 61b.

In Embodiments 3 and 4, a cylindrical buffering member is shown, but is not limited to this, and a buffering member that has a circular cross section such as that of an O ring, a solid shape, or a spherical shape may also be used, for example.

In addition, in Embodiments 1 through 4, a buffering member is disposed on a fixed core (a fixed portion), but may be disposed on a movable core (a movable portion). In other words, the buffering member holding portion may be a movable portion.

Furthermore, the braking apparatuses that are disposed on the elevator hoisting machine are not limited to a particular number.

The construction of the elevator hoisting machine is not limited to the example in FIG. 2. For example, the elevator hoisting machine need not be a thin hoisting machine.

In addition, the present invention can be applied to a disc brake if a braking apparatus has a buffering member that is disposed between a fixed portion and a movable portion.

Furthermore, the overall elevator equipment layout and roping method, etc., are not limited to the example in FIG. 1.

The suspending body may alternatively be a belt.

In addition, the present invention can be applied to various types of elevator apparatus, such as elevator apparatuses that have a machine room, double-deck elevators, or single-shaft multi-car elevators, for example.

Furthermore, the present invention can be applied to braking apparatuses other than for elevator hoisting machines.

The invention claimed is:

1. A braking apparatus comprising:
a buffering member holding portion that comprises at least one of a fixed portion and a movable portion;
the movable portion that is displaceable toward and away from the fixed portion;
a friction member that is disposed on the movable portion, and that brakes rotation of a rotating body by being placed in contact with the rotating body;
a forcing device that forces the movable portion in a direction that places the friction member in contact with the rotating body;
a braking force releasing device that displaces the movable portion in a direction in which the friction member separates from the rotating body in opposition to the forcing device; and
a buffering member that is disposed between the fixed portion and the movable portion,
wherein:
an accommodating recess portion that accommodates and holds the buffering member is disposed on the buffering member holding portion;
an opening portion disposed on a portion of a side surface of the accommodating recess portion;
the buffering member is removable from and insertable into the accommodating recess portion through the opening portion from a direction that is perpendicular to a direction of displacement of the movable portion;
the buffering member is formed using a rubber or a resin material that has flexibility;
a portion of an outer circumferential surface of the buffering member protrudes from the opening portion;
a deforming device that deforms the buffering member by pressing the buffering member in the direction that is perpendicular to the direction of displacement of the movable portion; and
the deforming device deforms the buffering member by pressing the outer circumferential surface of the buffering member.

2. The braking apparatus according to claim 1, wherein:
the deforming device comprises:
an adjusting bracket that is placed in contact with the portion of the outer circumferential surface of the buffering member that protrudes outward from the buffering member holding portion; and
an adjusting bolt that passes through the adjusting bracket and is screwed into the buffering member holding portion; and
the adjusting bracket is displaced toward the buffering member holding portion such that the buffering member is deformed by fastening the adjusting bolt.

3. The braking apparatus according to claim 1, wherein:
the deforming device comprises:
an adjusting bracket; and
an adjusting bolt that passes through the adjusting bracket and is screwed into the buffering member holding portion;
the adjusting bracket is displaced toward the buffering member holding portion such that the buffering member is deformed by the protruding portion by fastening the adjusting bolt.

4. An elevator hoisting machine comprising:
a rotating body that has a driving sheave around which a suspending body that suspends a car and a counterweight is wound;
a motor that rotates the rotating body; and
a braking apparatus that brakes rotation of the rotating body,
the braking apparatus having:
on a buffering member holding portion that comprises at least one of a fixed portion and a movable portion;
the movable portion that is displaceable toward and away from the fixed portion;
a friction member that is disposed on the movable portion, and that brakes rotation of a rotating body by being placed in contact with the rotating body;
a forcing device that forces the movable portion in a direction that places the friction member in contact with the rotating body;
a braking force releasing device that displaces the movable portion in a direction in which the friction member separates from the rotating body in opposition to the forcing device; and
a buffering member that is disposed between the fixed portion and the movable portion,
wherein:
an accommodating recess portion that accommodates and holds the buffering member is disposed on the buffering member holding portion;
an opening portion disposed on a portion of a side surface of the accommodating recess portion;
the buffering member is removable from and insertable into the accommodating recess portion through the opening portion from a direction that is perpendicular to a direction of displacement of the movable portion;
the buffering member is formed using a rubber or a resin material that has flexibility;
a portion of an outer circumferential surface of the buffering member protrudes from the opening portion;
a deforming device that deforms the buffering member by pressing the buffering member in the direction that is perpendicular to the direction of displacement of the movable portion; and
the deforming device deforms the buffering member by pressing the outer circumferential surface of the buffering member.

* * * * *